US006829425B2

(12) United States Patent
Barthel et al.

(10) Patent No.: US 6,829,425 B2
(45) Date of Patent: Dec. 7, 2004

(54) OPTICAL FIBER MANAGEMENT SYSTEM AND METHOD

(75) Inventors: William F. Barthel, Winneconne, WI (US); Steven J. Kleis, Menasha, WI (US); Laurie M. Anderson, Neenah, WI (US); Michael J. Johnson, Neenah, WI (US)

(73) Assignee: Plexus Corporation, Neenah, WI (US)

( * ) Notice: Subject to any disclaimer, the term of this patent is extended or adjusted under 35 U.S.C. 154(b) by 35 days.

(21) Appl. No.: 10/125,898

(22) Filed: Apr. 19, 2002

(65) Prior Publication Data

US 2003/0210882 A1 Nov. 13, 2003

(51) Int. Cl.[7] .............................. G02B 6/00; G02B 6/46
(52) U.S. Cl. ...................... 385/135; 385/134; 385/137
(58) Field of Search .................................. 385/134–138

(56) References Cited

U.S. PATENT DOCUMENTS

| | | | |
|---|---|---|---|
| 4,861,134 A | 8/1989 | Alameel et al. ........... 350/96.2 |
| 5,402,515 A | 3/1995 | Vidacovich et al. ........ 385/135 |
| 5,469,526 A | * 11/1995 | Rawlings .................... 385/135 |
| 5,473,716 A | 12/1995 | Lebby et al. ................. 385/54 |
| 5,659,641 A | 8/1997 | DeMeritt et al. ............. 385/14 |
| 5,703,991 A | * 12/1997 | Izumi .......................... 385/135 |
| 5,740,298 A | 4/1998 | Macken et al. ............. 385/135 |
| 5,758,002 A | 5/1998 | Walters ....................... 385/134 |
| 5,857,054 A | 1/1999 | Thomas et al. ............. 385/134 |
| 5,887,106 A | 3/1999 | Cheeseman et al. ........ 385/135 |
| 5,907,654 A | 5/1999 | Render et al. .............. 385/135 |
| 5,946,440 A | 8/1999 | Puetz .......................... 385/135 |
| 5,966,492 A | 10/1999 | Bechamps et al. .......... 385/135 |
| 5,987,207 A | 11/1999 | Hoke .......................... 385/135 |
| 6,144,792 A | 11/2000 | Kim et al. ................... 385/135 |
| 6,192,180 B1 | 2/2001 | Kim et al. ................... 385/135 |
| 6,201,920 B1 | 3/2001 | Noble et al. ................ 385/134 |
| 6,208,797 B1 | 3/2001 | Vanderhoof et al. ........ 385/135 |
| 6,215,064 B1 | 4/2001 | Noble et al. .................. 174/59 |
| 6,215,938 B1 | 4/2001 | Reitmeier et al. .......... 385/135 |
| 6,229,712 B1 | 5/2001 | Munoz-Bustamante et al. . 361/783 |
| 6,249,634 B1 * | 6/2001 | Tenney et al. .............. 385/135 |
| 6,263,141 B1 | 7/2001 | Smith .......................... 385/135 |

* cited by examiner

Primary Examiner—Akm Enayet Ullah
Assistant Examiner—Michelle R. Connelly-Cushwa
(74) Attorney, Agent, or Firm—Bell, Boyd & Lloyd LLC

(57) ABSTRACT

An optical fiber ramp management system provides a system, device and method for organizing, managing and storing optical fiber during and after the production of an opto-electronic assembly. Opto-electronic components are arranged on a substrate located at a first level so as to define a space between the components. The space defines an optical fiber pathway along the surface of the substrate through which optical fibers formed as fiber bundle travel. A ramp supports the fiber bundle as it extends from the substrate to a storage tray located at a second level. The optical fibers are retained on the storage tray as a plurality of unconstrained loops. The pathway, ramp and tray are formed to maintain the radius of curvature of the optical fiber at or above the minimum bend radius of the fiber.

30 Claims, 6 Drawing Sheets

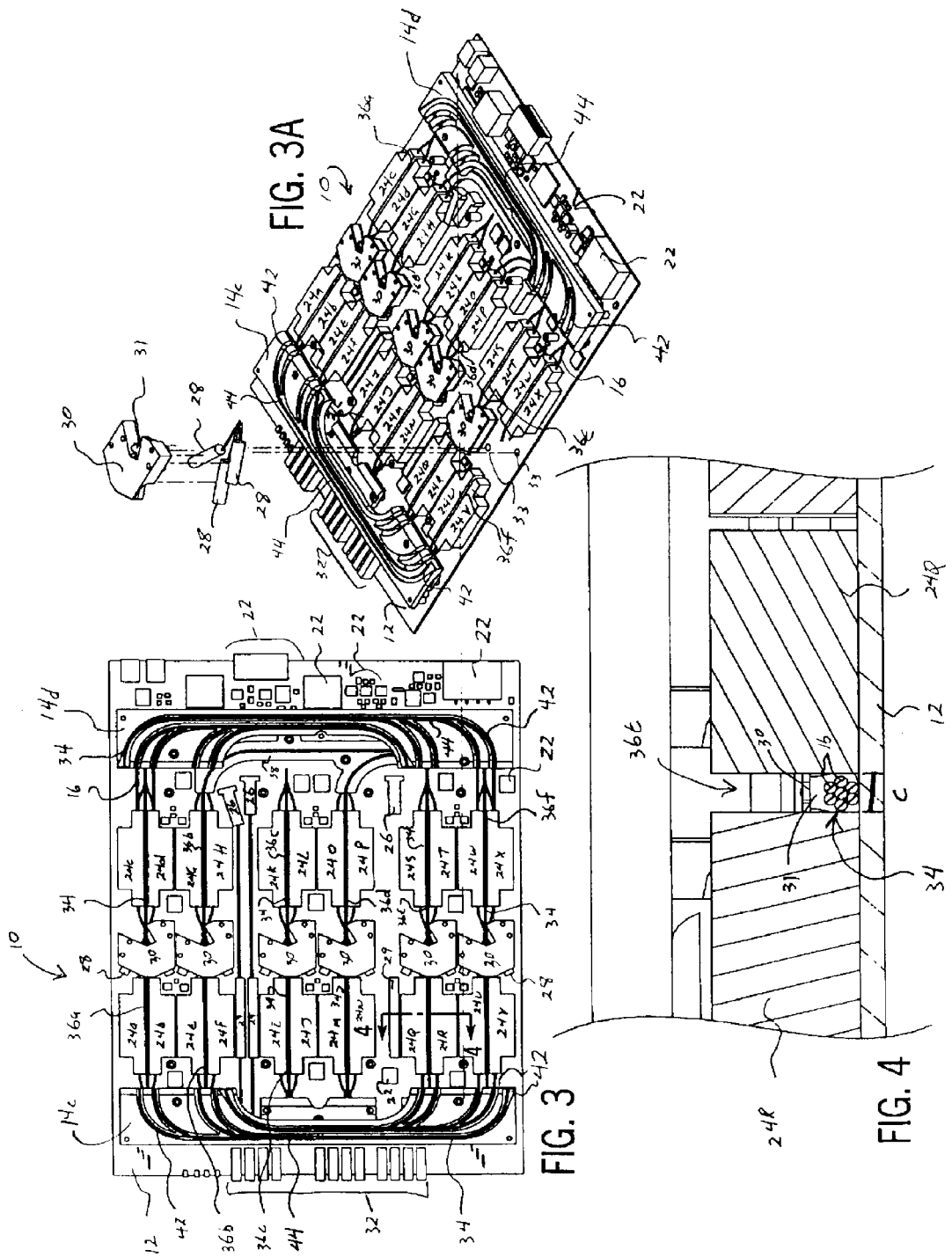

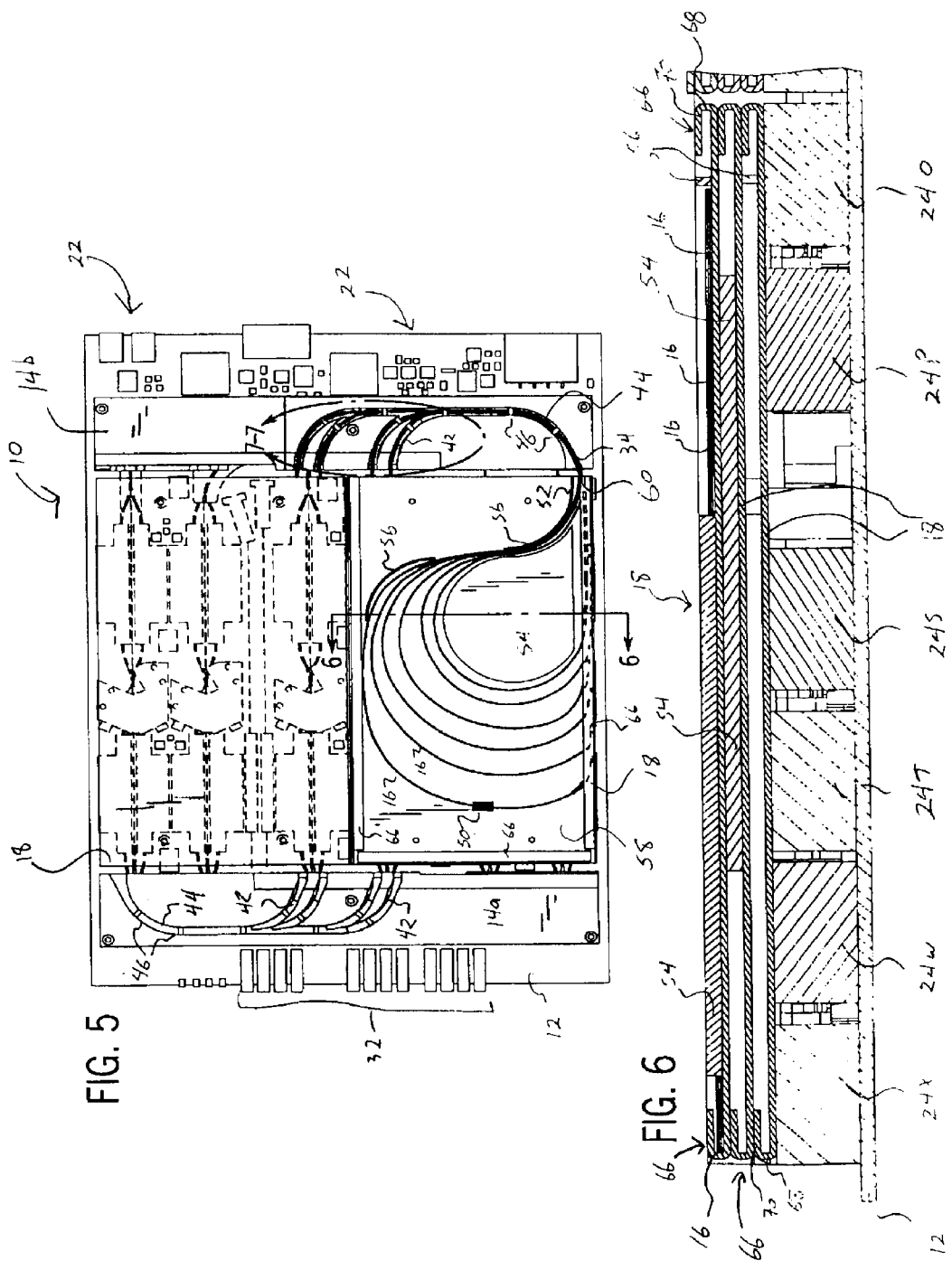

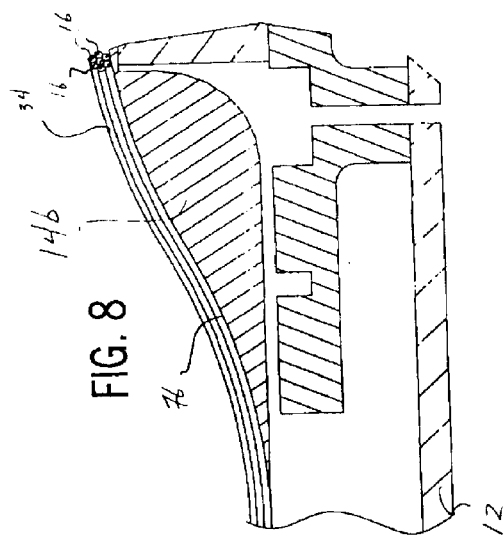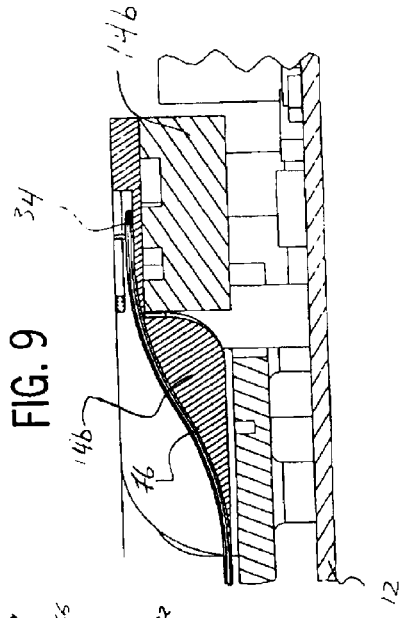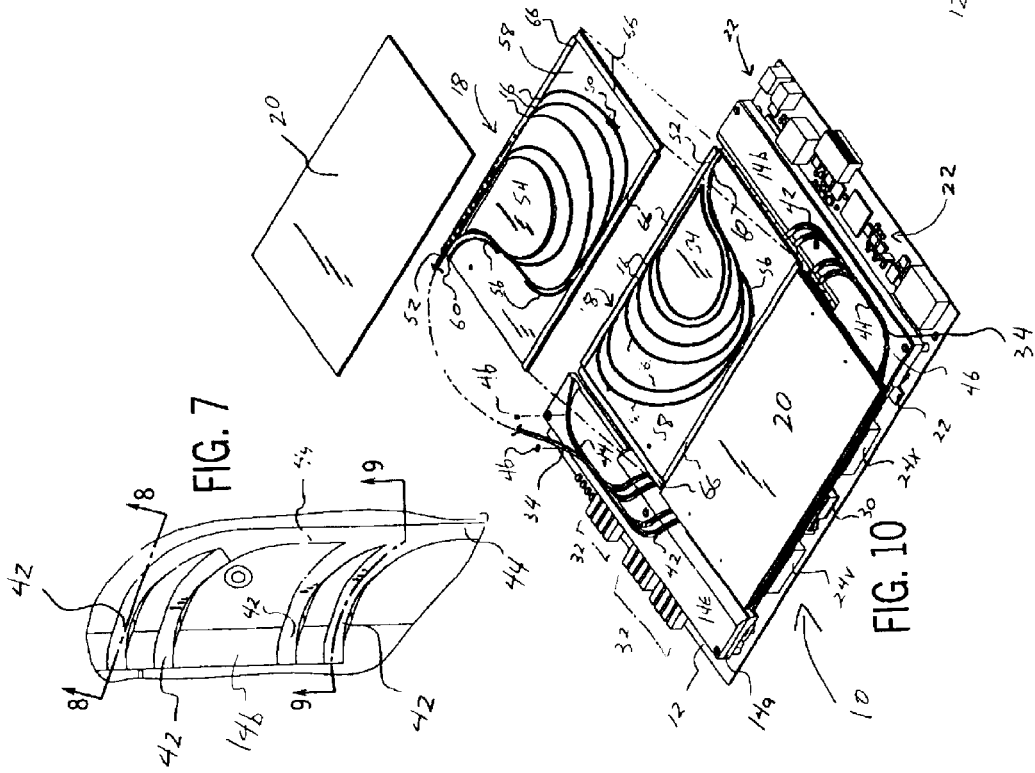

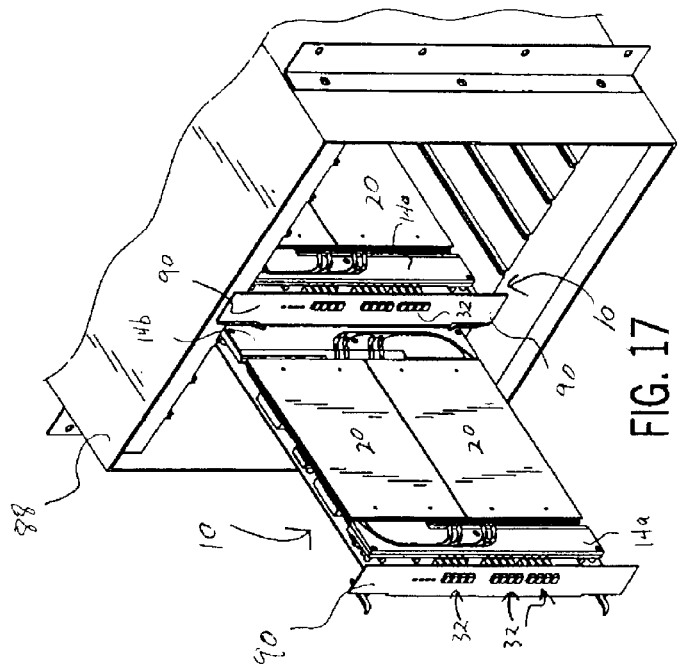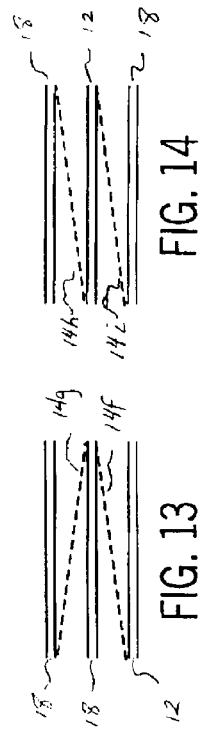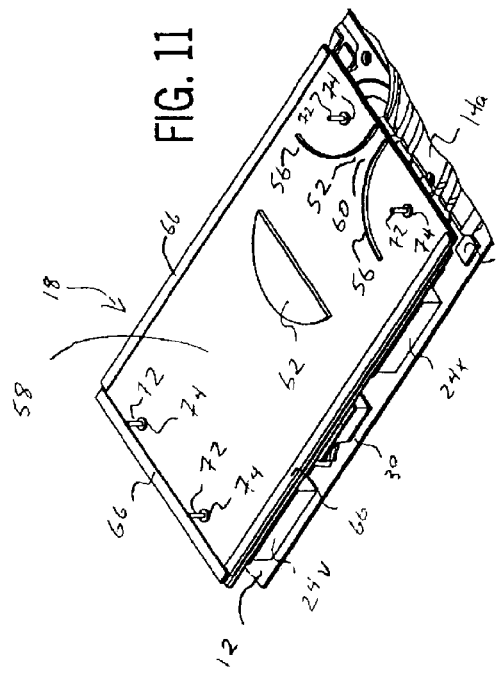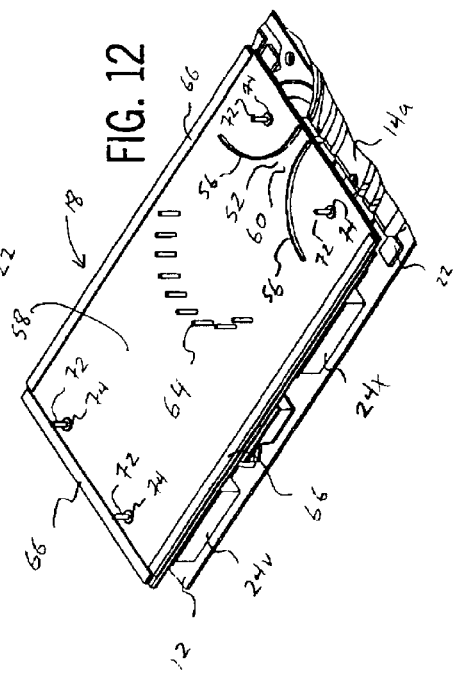

OPTICAL FIBER MANAGEMENT SYSTEM AND METHOD

FIELD OF THE INVENTION

This invention relates to a device, system and method for organizing, managing and storing optical fibers during and after the production of an optical or opto-electronic assembly.

BACKGROUND OF THE INVENTION

The advantages of combining optical signal processing with electrical applications are known, particularly in the telecommunications industry. Conventional manufacturing techniques for producing opto-electronic assemblies typically entail mounting electrical components onto the surface of a substrate, typically a printed circuit board, and establishing mechanical and electrical connections between the electrical components and the circuit board using solder joints. Opto-electronic components may be electrically and/ or mechanically mounted to the printed circuit board in similar fashion. In addition, the optical fibers connected to and extending from the individual opto-electronic components must be linked in order to complete the optical signal paths in order to perform the desired function of the final assembly. Known methods such as fusion splicing or ribbon splicing accomplish this task.

Conventional optical and opto-electronic production practices are subject to various constraints. First, optical fiber is sensitive to excessive bending which places constraints on the layout or design of the circuit board assembly. Components need to be mounted onto the printed circuit board surface so that the curvature radius of the optical fiber extending between the components is not less than a minimum bend radius of the fiber. Bending an optical fiber below the minimum bend radius degrades optical signal strength and introduces transfer errors. In addition, optical fiber generally should not be routed near components having sharp edges or components emitting heat as these features can have deleterious affects on the optical fiber. These constraints on the use of optical fiber tend to produce printed circuit boards cramped and crowded with opto-electronic and electronic components.

Second, managing and organizing optical fiber during the assembly process can be a difficult endeavor. As advances in technology continue to expand the applications and capabilities of opto-electronics, the demand for more complex devices having ever-increasing numbers of opto-electronic components and fibers shows no sign of diminishing. In addition, each opto-electronic component oftentimes requires multiple optical fiber connections. This leads to opto-electronic assemblies with many optical fibers which creates highly congested fiber pathways across the substrate surface during the assembly process.

Compounding this fiber congestion is the excess length each optical fiber requires for splices and re-splices. Organizing the fibers, keeping track of the origin of the optical fibers, ensuring the proper fibers are being connected, while simultaneously maintaining the functional integrity of each optical fiber can be a daunting task for even the most experienced assembler. This makes for an assembly process that is highly detail-oriented, extremely time consuming, labor intensive and very inefficient. Moreover, increasing the number of optical connections compounds defect rates which prompts more frequent service and repair to the fibers and components. In addition, conventional fusion splice and optical component yields (i.e., the number of functional optical connections prepared per the number of attempted fusion splices) can range anywhere between 60% to 90%, further compounding the problem.

Furthermore, known devices and methods of storing excess fiber in a loop (i.e., excess optical fiber resulting from the fusion splicing process) typically wrap the fiber through or around a guideway or similar structure. This requires the length of the post-spliced fiber to be a whole increment of the guideway perimeter so as to avoid fiber slack when stored. The same drawback applies to the re-splicing process. Only re-splice fiber lengths in multiples or increments of the guideway perimeter can be used so that the length of the fiber after the re-splice will properly fit into the storage guideway without any slack. Thus, if a re-splice requires only one-half the length of the guideway perimeter, the remaining half length of fiber must be discarded so that the post-splice fiber length fits properly into the storage device.

A need therefore exists for a system, device and method which can organize and manage optical fiber during the production of optical and opto-electronic assemblies. A need further exists for a more efficient, versatile and less wasteful manner of storing excess optical fiber attached to optical and opto-electronic assembly.

SUMMARY OF THE INVENTION

In accordance with the present invention, an improved optical fiber management system for organizing and managing optical fibers for an optical assembly is provided. The system includes an optical assembly having an arrangement of a plurality of optical components. The optical components are arranged to define a space between the components, the space defining an optical pathway. The system further includes an optical fiber, a tray and a ramp extending between the pathway and the tray. The optical fiber is extended between the pathway along the ramp and onto the tray so the radius of curvature for the fiber in the pathway, ramp and tray is greater than or equal to the minimum bend radius of the fiber.

In one aspect of the present invention, the system includes a substrate located at a first level having opto-electronic components arranged to define a space between the components. The space defines a pathway on the substrate for the optical fibers. The optical fibers are formed into a fiber bundle and routed through the space. The pathway can be aligned with a ramp which carries the fiber bundle from the substrate to a storage tray located at a second level. The pathway and ramp route the fiber bundle so that the curvature radius of the optical fibers is greater than or equal to the minimum bend radius of the fiber. Similarly, the system stores loops of excess optical fiber at or above the minimum bend radius.

In one aspect, the optical fiber management system of the present invention, the opto-electrical components defining the space have a height, such as a height above the substrate when mounted thereto, which exceeds the height over which the optical fiber bundle can pass. A plurality of fiber bundles are routed through a plurality of pathways and the fiber bundles are extended away from the substrate. Individual optical fiber connections are formed between fibers from the same fiber bundle or from fibers from different fiber bundles. These connections provide optical pathways between the opto-electrical components. The system also includes connecting fiber bundles to other fiber bundles to form optical pathways.

In accordance with another aspect of the present invention, a device for routing optical fiber from one level to another level is provided. The device includes an arrangement of opto-electronic components on a substrate located at a first level, a storage tray located at a different or a second level, and a ramp extending between the substrate and the tray. Optical fibers formed into a fiber bundle are routed from the substrate along the ramp and into the tray. In one embodiment, the ramp includes channels which support the fiber bundles as they travel to the tray so that the radius of curvature for the optical fibers is greater than or equal to the minimum bend radius. The channels may merge into passages which carry and support a plurality of fiber bundles to the tray.

In accordance with another aspect of the present invention, an optical fiber storage device is provided. The storage device includes a tray, a storage area, an optical fiber inlet and outlet and a guide for preventing the optical fiber stored in the tray from having a radius of curvature less than the minimum bend radius. The optical fiber is stored as a loop in the tray. The loop is larger than the minimum size loop that is defined by the guide, the loop being unconstrained or substantially unconstrained. The size of the storage area relative to the guide enables the optical fiber loops larger than the guide to reside in the tray unconstrained. The tray has no guideway defining an upper boundary for the fibers. This allows the tray to store optical fibers over a very wide range of lengths with the minimum length defined by the guide which also determines the minimum radius of curvature of a loop stored therein. Lips extending around the perimeter of the tray retain the optical fiber loops in the tray. In one embodiment, the guide may be teardrop-shaped or curved. The guide may also be formed by an array of spaced-apart upright members which define a radius of curvature that is greater than or equal to the minimum bend radius.

In accordance with another aspect of the present invention, a device for storing optical fiber which has heat dissipating structure is provided. The device includes an optical fiber storage tray having a base and an optical fiber inlet and outlet. The base has one or more and preferably a plurality of perforations through which heat can freely pass. When the tray is positioned above or below the substrate, the perforations allow heat generated from the opto-electronic components to freely pass therethrough. The tray may further include an optical fiber guide to define a minimum bend radius wherein the guide may be perforated. In one embodiment, a fin may extend along the underside of the perforated base and direct a flow of heated air from or cool air to the components.

In another aspect of the invention, the fiber management system provides for an optical fiber storage tray having a fin extending along the underside of the tray. The fin is shaped to direct heated air generated by the components away from heat-generating components or from the substrate. The tray may be made of a conductive material and absorb radiant heat away from the components.

In accordance with still another aspect of the present invention, a method of assembling an opto-electronic assembly is provided. In accordance with this method, the optical fibers are formed into a bundle having an intermediate length. Opto-electronic components having a height exceeding the height over which the optical fiber bundle can pass are arranged on a substrate so as to define a space between the components. The space comprises a pathway for the bundle. The pathway is formed so that any curvature of the pathway has a radius of curvature that is greater than or equal to the minimum bend radius of the fiber in the bundle. At least a portion of the intermediate length is routed through a portion of the pathway. The method may further include routing a plurality of fiber bundles away from the substrate through a plurality of pathways. Optical fiber pathways are formed by connecting individual optical fibers to other optical fibers or by connecting fiber bundles to other fiber bundles. These optical connections produce optical pathways.

In accordance with another aspect of the present invention, a method of storing excess length of optical fiber extending between optical components located on a substrate is provided. In accordance with this method, a tray is provided having an optical fiber inlet opening and a storage area. Optical fibers are passed through the optical fiber inlet and into the storage area and form an unconstrained unbundled loop with each of the optical fibers on the tray. The unbundled loops each have a radius of curvature greater than or equal to the minimum bend radius of the optical fiber. The method further includes extending the optical fibers between the substrate and the tray by routing the optical fibers on a ramp. Typically, the optical fiber on the tray will be exited via an optical fiber outlet that can be the same or different opening from the inlet opening.

BRIEF DESCRIPTION OF THE DRAWINGS

FIG. 3 is a plan view of an opto-electronic assembly with pathways, fiber bundles and ramps according to the invention;

FIG. 3A is a perspective view, partially exploded, of the assembly of FIG. 3;

FIG. 4 is a sectional view of a fiber bundle in a pathway taken along line 4—4 of FIG. 3;

FIG. 5 is a plan view of an optical fiber management system according to the invention;

FIG. 6 is a sectional elevation view along line 6—6 of FIG. 5 showing the substrate, component and tray levels;

FIG. 7 is an enlarged fragmentary view of area defined by curved line 7—7 of FIG. 5 showing ramp channels and a ramp passage;

FIG. 8 is a sectional view along line 8—8 of FIG. 7 showing a longitudinal section of fibers in a ramp channel according to the invention;

FIG. 9 is a sectional view of a channel taken along line 9—9 of FIG. 7 showing longitudinal section of fibers in a ramp channel according to the invention;

FIG. 10 is a partially exploded perspective view of a fiber management system according to the invention;

FIG. 11 is a perspective view of an alternative embodiment storage device used in the optical fiber management system according to the invention;

FIG. 12 is a perspective view of an alternative embodiment storage device used in the optical fiber management system according to the invention;

FIG. 13 is a side elevation schematic view of the optical fiber ramp system according to the invention showing the arrangement of the substrate in relation to the storage devices;

FIG. 14 is a side elevation schematic view of the optical fiber ramp system according to the invention showing an alternative embodiment arrangement of the substrate in relation to the storage devices;

FIG. 17 is a partial perspective view of an optical fiber management system of the invention in an operating environment.

DETAILED DESCRIPTION OF THE INVENTION

Figure 1:
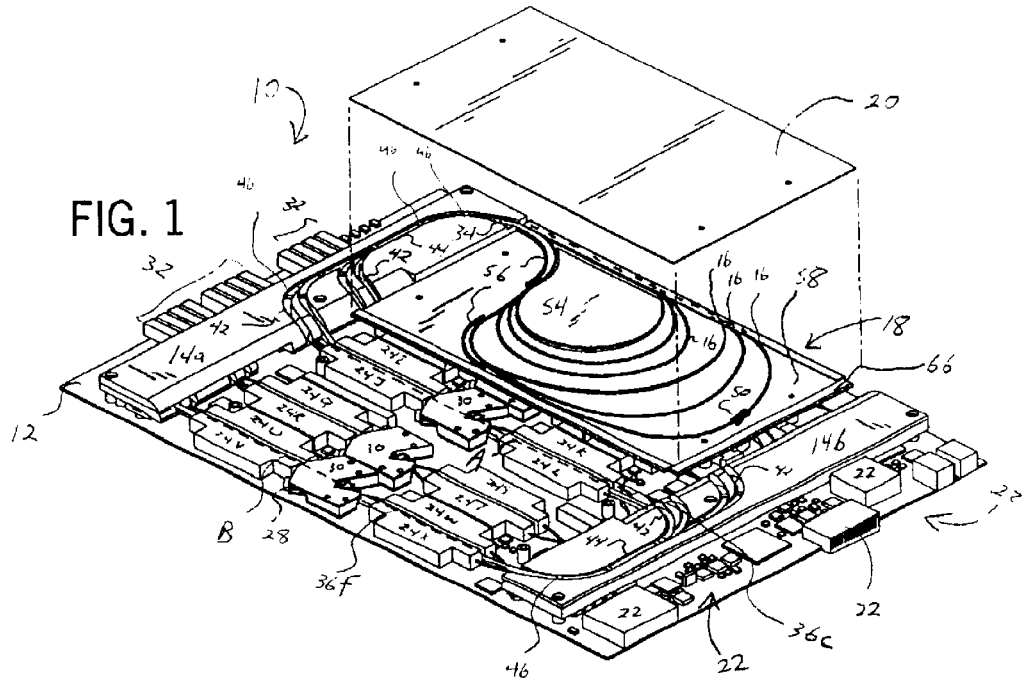
FIG. 1 is a partially exploded perspective view of an optical fiber management system according to the invention.

Referring to the Figures generally, where like reference numerals denote like structure and elements, and in particular to FIGS. 1–4, an optical assembly 10 is shown in accordance with the invention. Assembly 10 includes a substrate 12, a plurality of opto-electronic components 24a–24x, 26, 28, 29 and 32, a plurality of electrical components 22, ramps 14a and 14b, a plurality of optical fibers 16, an optical fiber storage tray 18 and a tray cover 20. Substrate 12 is typically a printed circuit board although any composition suitable as a platform for the mounting and interconnection of electronic and opto-electronic components may be used. Solder joints as are commonly known in the art electrically and/or mechanically connect electrical components 22 to substrate 12. The precise make-up of electrical components 22 may vary greatly depending on the final application of assembly 10. Examples of electrical components 22 that may be mounted onto substrate 12 include, but are not limited to, resistors, capacitors, integrated circuits, processors, memory chips, diodes, switches and relays.

Figure 2:
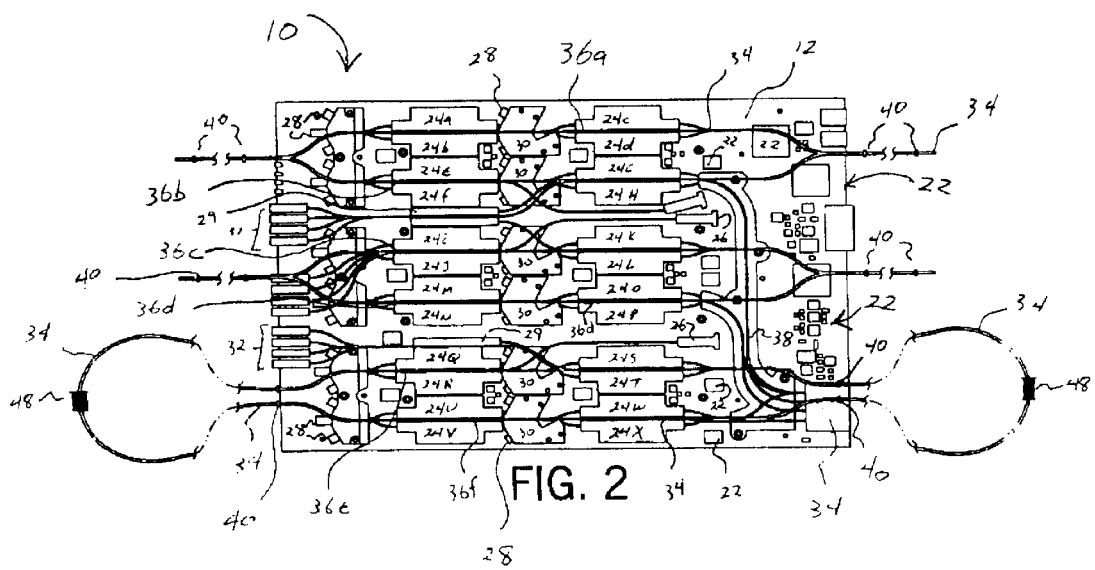
FIG. 2 is plan view of an opto-electronic assembly having pathways and fiber bundles according to the invention.

The opto-electrical components shown in FIGS. 1 and 2 include optical switches 24a, 24b, 24c, 24d, 24e, 24f, 24g, 24h, 24i, 24j, 24k, 24l, 24m, 24n, 24o, 24p, 24q, 24r, 24s, 24t, 24u, 24v and 24x, which may include micro-electronic machines; lasers 26, which may include laser controllers and/or laser drivers; photo diodes 28 and optical splitters 29. Opto-electronic components 24a–24x, 26, 28 and 29 are affixed to substrate 12 in like manner as electronic components 22, namely through solder joints. One of ordinary skill in the art will realize that the invention is not limited to the aforementioned opto-electronic components as the composition of opto-electronic components on substrate 12 will vary greatly depending on the final application of assembly 10. In fact, assembly 10 may comprise only optical components. Other types of optical components may include, but not be limited to, fillers, phase shifters and BRAGG grating.

Also mounted to substrate 12 are holders 30 and optical fiber connectors 32. Holders 30 are passive opto-components which mechanically hold photo diodes 28 in place on the surface of substrate 12. Optical fibers connected to fiber connectors 32 interconnect assembly 10 to other external assemblies, other types of circuit boards or substrates. The skilled artisan will further recognize that electrical components 22 need not be isolated to the far right region of substrate 12 as shown in FIGS. 1 and 2. Rather, electrical components may be positioned anywhere upon the surface of substrate 12 including between opto-electronic components 24a–24x, 26, 28 and 29 as well as between holders 30 and fiber connectors 32. Essentially, the opto-electronic components need not be segregated from the electronic components on substrate 12.

Connected to optical components 24a–24x, 26, 28 and 32 are optical fibers 16. Each optical fiber 16 has a connected end, a free end and an intermediate length extending between the ends. Optical fiber 16 is optically transparent and typically comprises a fiber core and may be coated with one or several layers of protective plastic and/or Kevlar. Excessive bending is deleterious to optical fiber 16 as it degrades optical signal strength. When optical fiber is bent beyond the minimum bend radius or is placed in a tensile load, a crack may occur which leads to signal degradation and/or mechanical failure. Consequently, manipulating or handling optical fiber at or above the minimum bend radius of the optical fiber employed is preferred. The skilled artisan will appreciate that minimum bend radius is a relative value and may vary greatly depending on fiber type, fiber diameter as well as the application in which the optical fiber is employed.

During the assembly process, the free end of each optical fiber 16 is linked to the free ends of optical fibers from other individual optical and/or opto-electronic components in order to complete the optical signal paths between the optical and opto-electronic components. FIG. 1 shows assembly 10 after optical fibers 16 have been connected. The intermediate lengths of optical fibers 16 are gathered to form optical fiber bundles 34. Fiber bundles 34 are routed between the opto-electronic components to ramps 14a and 14b as shown by dotted line A in FIG. 1. Fiber bundles 34 are then routed through ramps 14a and 14b which carry fiber bundles 34 away from the plane of substrate 12. Fiber bundles 34 extend through ramps 14a and 14b and the excess length of the optical fibers 16 are stored in tray 18. Tray cover 20 is placed on tray 18 as the operational environment may require assembly 10 to stand upright or in an otherwise substantially non-horizontal plane.

The assembly process for optical and opto-electronic assemblies is intimately linked to the design of the opto-electronic assembly. FIG. 2 shows how the design of assembly 10 promotes production efficiencies during the assembly process. The present invention provides a unique approach to overcoming the confining nature of substrates populated with optical and opto-electronic components while simultaneously organizing optical fibers. A group of two optical switches 24a and 24b are arranged so as to establish a space between the two optical switches 24a and 24b as shown in FIG. 2. Another group of two optical switches, 24c and 24d, are arranged in a similar fashion. Optical switches 24a, 24b, 24c and 24d are then arranged on substrate 12 to define an optical fiber pathway 36a. Optical switches 24a, 24b, 24c and 24d are positioned on substrate 12 so that the curvature radius of pathway 36a is greater than or equal to the minimum bend radius for any individual optical fiber 16 routed through pathway 36a. In addition, optical switches 24a, 24b, 24c and 24d are positioned on substrate 12 so that pathway 36a avoids heat generating components or sharp objects that may otherwise damage or degrade the performance of optical fibers 16. In a similar manner, optical switches 24e, 24f, 24g and 24h form pathway 36b; optical switches 24i, 24j, 24k and 24l form pathway 36c (which is the same as dotted line A in FIG.1); optical switches 24m, 24n, 24o and 24p form pathway 36d; optical switches 24q, 24r, 24s and 24t form pathway 36e; optical switches 24u, 24v, 24w and 24x form pathway 36f (which is the same as dotted line B of FIG. 1). The skilled artisan will recognize that a plurality of any type of optical components, opto-electronic components or a combination thereof may be arranged to form an optical fiber pathway without detracting from the scope of the present invention.

As opto-electronic components 24a–24x, 26, 28 and 32 are mounted onto substrate 12 individual optical fibers 16 are gathered and arranged into fiber bundles 34. Fiber bundles 34 are formed by placing optical fibers 16 into pathways 36a–36f. Optical fiber bundle 34 is a co-location of a plurality of individual optical fibers 16, the individual optical fibers having no physical interconnections. This allows optical fibers 16 to enter or exit pathways 36a–36f at any point as dictated by the functional requirements of final assembly 10 and the minimum bend radius of the optical fiber. The number of optical fibers 16 forming a fiber bundle 34 may vary anywhere between two optical fibers to hundreds or even thousands of individual optical fibers. Optical fibers 16 that form fiber bundle 34 may originate from individual optical or opto-electronic components located anywhere on substrate 12 as dictated by the functional optical connections required in final assembly 10. Preferably, substrate 12 is designed so that opto-electronic components 24, 26, 28, 29 and 32 are arranged so that optical fibers 16 from adjacent or otherwise neighboring opto-electronic components form fiber bundles 34. Alternatively, fiber bundle 34 is formed by gathering optical fibers 16 which extend between components having a common or similar function.

The formation of fiber bundles provides several advantages. Fiber bundles are easier to handle than individual optical fibers and the risk of damage is reduced due to the greater structural stability of fiber bundles. Fiber bundles 34 and pathways 36a–36f also protect optical fibers 16 from sharp-edged and high temperature equipment used during the soldering and component mounting processes.

Pathways 36a–36f extend underneath holders 30. The free ends of fiber bundle 34 are routed through opening 31 in holder 30 as shown in FIGS. 3A and 4. Alternatively, holder 30 is secured into place after fiber bundles 34 are positioned in pathways 36a–36f. It is understood that many applications of assembly 10 may not require holders 30. Consequently, holders 30 are not necessary to establish pathways 36. FIG. 3A shows an exploded view of holder 30. Holder 30 secures photo diodes 28 in place on the surface of substrate 12 and away from pathways 36a–36f. Holes 33 enable holder 30 to be mounted onto the surface of substrate 12 as is commonly known in the art. Opening 31 in holder 30 enables fiber bundle 34 to pass through holder 30 unobstructed. Holder 30 may hold photo diodes 28 directly on the surface of substrate 12 or slightly above the surface of substrate 12 as desired.

Pathways 36a–36f direct fiber bundles 34 away from and off the surface of substrate 12 as shown in FIG. 2. Raceway 38 may provide additional guidance for larger fiber bundles or for fiber ribbon. Fiber ribbon is a plurality of interconnected optical fibers, typically coplanar with one another. Correspondingly, individual optical fibers of fiber ribbon cannot be routed independently. Once fiber bundle 34 is extended beyond substrate 12, temporary ring 40 is wrapped as necessary around bundle 34 to keep fiber bundle 34 intact. Labels (not shown) may be attached to each individual fiber 16 to assist in the identification of the optical fibers. This labeling can occur either before or after the wrapping of fiber bundle 34 with ring 40. Additionally, ring 40 can be used to wrap multiple fiber bundles 34 together as they extend away from substrate 12.

Fiber bundles 34 extend to a splicing site (not shown) located away from substrate 12. Splicing equipment as is commonly known in the art is used to splice optical fibers together to produce the optical pathways between the opto-electronic components. Individual optical fibers may be fusion spliced to individual optical fibers from the same fiber bundle or from a different fiber bundle as dictated by the functional requirements of assembly 10. Individual optical fibers may also be mechanically spliced together. Mechanical splicing provides an optical connection between two optical fibers by precision alignment of the cores that carry the light signals. The fibers are held within close proximity of each other but are not actually melted together as in fusion splicing.

Alternatively, a fiber bundle 34 may be mass fusion spliced to another fiber bundle 34. This carries several advantages. Splicing a fiber bundle to another fiber bundle significantly reduces the fusion splicing cycle time thereby reducing overall assembly time. In addition, the mass fusion spliced bundle is comprised of individual optical fibers which can be routed separately. This allows substantial versatility in optical connection options, fiber routing and fiber management considerations as opposed to the use of fiber ribbon wherein the individual optical fibers are bound together and cannot be routed independently. Splice 48 in FIG. 2 shows a bundle-to-bundle optical connection. Splice 50 in FIG. 1 illustrates a splice connecting a single optical fiber 16 to another individual optical fiber 16.

The delicate nature of optical fibers contributes to the relatively low yields of the fusion splicing process. Fiber contamination, poor cleaves, fiber mishandling, recoating problems and splice sleeve offset are some of the factors that can contribute to a faulty fusion splice. Further examples of fusion splicing defects include a bent core, core offset, a hot spot, a bulge, waisting or matchsticking. Any of these conditions, either alone or in combination, can contribute to a faulty optical connection. If the splice is defective, the fiber must be respliced. Consequently, it is not surprising for opto-electronic assembly processes to regularly experience very low fusion splicing yields.

A further advantage of the present invention is that the layout of the opto-electronic components, the creation of the optical fiber pathways, and the bundling of individual optical fibers into fiber bundles allows for the creation of optical connections regardless of the position of the opto-electronic components on the substrate. This enables segments of the assembly to be tested "in-situ"—i.e., before assembly of the optical or opto-electronic assembly is complete. In-situ testing provides greater assurance that the assembly process is proceeding as required, it reduces overall assembly time and allows testing of components and connections that may not be accessible once assembly of the optical or opto-electronic assembly is complete. Hence, in-situ testing enables faulty connections or defective components to be identified and corrected almost immediately.

In-situ testing may be accomplished through a work holder system. A work holder system supports the substrate, organizes and temporarily secures the optical fibers prior to and after fusion splicing prior to the routing of the fibers through ramps and into the storage trays. Electrical and optical interconnections link the optical pathways, the electronic components and the opto-electronic components to testing and monitoring equipment. As power is supplied to the substrate, the testing and monitoring equipment provide real-time feedback on the integrity of the optical connections as well as the operability of the opto-electronic components. The fiber organization resulting from the pathways and fiber bundles enable distinct optical paths to be readily isolated. This substantially reduces the time required to identify and repair a faulty optical connection or component. In addition, controlling the fiber as fiber bundles routed through the pathways, ramps and trays reduces the forces applied to the fiber as well as maintaining the fiber at or above the minimum bend radius.

Once fusion splicing is complete and the optical connections between the fibers are established, fiber bundles 34 are extended from pathways 36a–36f into ramps 14a and 14b as shown in FIG. 1. Ramps 14a and 14b have channels 42 which align with pathways 36a–36f to carry fiber bundles 34, optical fiber 16 or fiber ribbon away from the plane of substrate 12. For example, FIG.1 shows how pathway 36c (i.e., dotted line A) is aligned with channel 42 and feeds fiber bundle 34 into channel 42. Similarly, pathway 36f (dotted line B) is aligned with another channel 42. Pathways 36a–36f preferably feed fiber bundles 34 into ramps 14a and 14b at or above the minimum bend radius of the fiber. Once placed into channels 42, fiber bundles 34 are routed into trays or other ramps. Alternatively, raceway 38 may be used to route fiber bundles 34 along the surface of substrate 12.

It is preferred that fiber bundles 34 initially enter ramps 14a or 14b through a separate channel 42. As seen in FIGS. 1, 5, and 10, fiber bundles 34 enter ramps 14a and 14b through channels 42 then merge into passages 44. Passages 44 have adequate width and depth to accommodate and support a plurality of fiber bundles 34. Depending on the design requirements of assembly 10, ramps 14a and 14b may eliminate channels 42 altogether and have only passages 44. The converse is also true wherein the ramps may omit channels altogether and have only passages. Channels 42 and passages 44 may be applied to ramps 14c, 14d, 14e, 14f, 14g, 14h and 14i in a similar manner.

The position and length of the channels and passages on the ramps may be modified as necessary based on the layout of the components on substrate 12 and the overall requirements of assembly 10. For example, FIGS. 3 and 3A show ramps 14c and 14d with multiple channels 42 and passages 44 which may be used to initially route fiber bundles 34 as well as individual optical fibers 16 off of substrate 12 to a second level. At this second level, ramps 14c and 14d may then feed fiber bundles 34, optical fiber 16 or fiber ribbon directly onto trays 18 or to other ramps. Ramps 14c and 14d may combine or eliminate channels 42 and passages 44 in the same manner as described for ramps 14a and 14b.

In an alternate embodiment of the present invention, ramps 14a and 14b may be stacked above ramps 14c and 14d. In this configuration, ramps 14a and 14b have a sufficient degree of inclination to extend above ramps 14c and 14d. Ramps 14a and 14b receive fiber bundles 34 from pathways 36a–36f and route the fibers to trays 18. Hence, ramps 14c and 14d may route fibers to a first level of trays while ramps 14a and 14b route fibers from the substrate to trays located at a second level. The number of ramps may be stacked as desired. For example, FIG. 10 shows ramp 14e transferring fiber bundles 34 from substrate 12 to tray 18 that is to be positioned at a third level (i.e., above one tray). Ramps 14a and 14b may also route fibers from ramps 14c and 14d to trays 18. Alternatively, a single ramp may extend between substrate 12 and a plurality of different levels. Channels and/or passages on this single ramp may feed optical fiber to trays or other ramps located at the different levels.

Pathways may also be formed by optical and/or opto-electrical components located on different substrates. Substrates may be aligned so that the pathways extend between the substrates in substantially the same plane. Pathways may also be formed by substrates located at different levels. Of course, the optical fiber is routed through the pathways and between the different levels at a radius of curvature greater than or equal to the minimum bend radius of the fiber. Pathways feeding fiber bundles into ramps from multiple levels can be routed to a single ramp having multiple channels and/or passages corresponding to the multiple levels to receive the fiber bundles. Alternatively, a plurality of ramps may be used. Similarly, the ramp or ramps may feed the fiber bundles into a single tray or into a plurality of trays, which may be located at different levels. In addition, an optical component may be mounted onto any ramp.

The optical fibers are preferably combined into fiber bundles according to common functionality or common location. In like manner, it is preferred to route the fiber bundles through separate channels and store each fiber bundle on a separate tray. Segregation of related fibers onto separate trays improves the troubleshooting process. When a malfunction occurs, the optical fibers associated with the malfunction are already isolated on a separate tray. This reduces the time required to identify and repair the faulty connection or component with minimal disruption to other components or fiber. In addition, other trays along with contained fiber can be left intact.

FIG. 7 is an enlarged view of the area of ramp 14b encircled by curved line 7—7 of FIG. 5. The width and depth of channels 42 and passages 44 are formed to support any fiber extending therethrough at or beyond the minimum bend radius of the fiber in all three axes. The number of fibers passing through channels 42 and passages 44 may vary from one optical fiber to thousands of optical fibers. In one embodiment, the width of channel 42 is from about 0.15 inch to about 0.30 inch. The depth of channel 42 is about 0.2 inch to about 0.4 inch. The width of passage 44 is about 0.3 inch to about 0.6 inch. The depth of channel 44 is about 0.4 inch to about 0.8 inch. FIG. 8 is a cross-sectional view of channel 42 of ramp 14b along line 8—8 of FIG. 7 and shows inclined surface 76 supporting fiber bundle 34 as fiber bundle 34 extends away from the surface of substrate 12. Inclined surface 76 maintains fiber bundle 34 at or above the minimum bend radius. The degree of inclination of inclined surface 76 may be varied as desired. FIG. 9 is a cross-sectional view of channel 42 along line 9—9 of FIG. 7 and shows inclined surface 76 transferring fiber bundle 34 from the level of substrate 12 to a second level above substrate 12. Fiber bundle 34 is subsequently routed to another ramp or a tray as previously described. The skilled artisan will realize that inclined surface 76 may carry fiber bundle 34 either above or below substrate 12.

Plugs 46, as shown in FIGS. 1, 5, 10 and 15, transverse the top of channels 42 or passages 44 and keep fiber bundles 34 or optical fibers 16 in channels 42 and passages 44. This is particularly useful as the final operating environment may require assembly 10 to be stowed in an upright, canted or upside down position. Plugs 46 may be made of a compressible foam-like material and compressed to fit into either channels 42 or passages 44. Alternatively, plugs 46 are made from a rigid material and attach to the tops of channels 42 and passages 44 in a manner commonly known in the art. Such attachments include but are not limited to a male-female joint, a screw, a snap, a clip or a lockable hinge.

FIG. 4 is a cross-sectional view showing fiber bundle 34 traveling through pathway 36e. Fiber bundle 34 is also shown extending through opening 31 of holder 30. Fiber bundles 34 extend through the other pathways and the other holders in a similar manner. Optical switches 24q and 24r have a height to adequately contain fiber bundle 34. Preferably, the height of optical switches 24q and 24r is substantially high such that fiber bundle 34 cannot pass over optical switches 24q and 24r. It is understood that any optical or opto-electronic component having a height greater than the height which fiber bundle 34 can pass over may be used to create the pathways 36a–36f. The surfaces of optical switches 24q and 24r which form pathway 26e are preferably smooth or flat so as to reduce or eliminate the risk of damage to optical fibers 16 passing therethrough. It is further preferred that any connections between the optical fibers and the optical and/or opto-electronic components not be located in the pathways. It is preferred that the surfaces of optical switches 24a–24p and 24s–24x are similar to the surfaces of optical switches 24q and 24r.

The width of pathway 36e, depicted as distance C in FIG. 4, is of sufficient length to accommodate fiber bundle 34 without fiber bundle 34 rubbing against the sides of optical switches 24q and 24r. Optical switches 24q and 24r may be positioned to either increase or decrease the length of distance C. For example, a smaller assembly, highly populated with opto-electronic components, may require narrow fiber pathways. Likewise, a large assembly with many opto-electronic components and many optical fibers may require wider pathways to accommodate fiber bundles with a large number of optical fibers. Optical switches 24a–24p and 24s–24x may be re-positioned to vary the width of the pathways in a similar manner depending on the design requirements of assembly 10. In one embodiment, the length of distance C is in the range of about 0.05 inches to about 0.75 inches. In this embodiment, the preferred distance C is a length of about 0.2 inches.

Although fiber bundle 34 of FIG. 4 comprises seven optical fibers 16, it is understood that fiber bundle 34 can be comprised of fewer or more optical fibers 16 as previously discussed. Fiber bundle 34 may travel through pathway 36e with a substantially round cross-section as shown in FIG. 4. Alternatively, individual fibers 16 may be arranged linearly and extend through pathway 36e in either a substantially horizontal or substantially vertical plane. Fiber ribbon may also travel through pathway 36e. Fiber bundle 34 extends through pathway 36e and contacts the surface of substrate 12 as shown in FIG. 4. Alternatively, fiber bundle 34 may travel slightly above the surface of substrate 12. Preferably, fiber bundle 34 travels through pathways 36a–36f substantially parallel to the top surface of substrate 12.

Fiber bundles 34 extend between substrate 12 and optical fiber storage tray 18 and are supported by ramp 14b as shown in FIG. 5. Channels 42 receive fiber bundles 34 from pathways 36a–36f. A plurality of fiber bundles 34 merge in passage 44 which feeds the plurality of fiber bundles 34 into inlet 52 of tray 18. Alternatively, a single channel 42 may feed a single fiber bundle 34 into tray inlet 52. Once fiber bundle 34 enters inlet 52, fiber bundle 34 disbands and separates into individual loops of optical fibers 16. Correspondingly, individual optical fibers 16 reassemble into fiber bundle 34 as the fibers move toward outlet 60. Preferably, inlet 52 and outlet 60 comprise a single opening. The location of inlet 52 on tray 18 may vary depending on how fiber bundles 34 are fed from the ramps. It is understood that each tray may have more than one inlet, more than one outlet and that a single ramp can feed optical fiber to more than one tray. In FIG. 5, inlet 52 is on the left side of tray 18. In FIGS. 11 and 12, inlet 52 is in the middle of tray 18. In FIG. 10, inlet 52 is on the right side of lower tray 18.

Tray 18 includes central guide 54 and peripheral guides 56. Central guide 54 is a passive device which prevents optical fibers 16 from having a radius of curvature less than the minimum bend radius. Central guide 54 is a teardrop shape in FIG. 5. However, any shape or structure that prevents optical fibers 16 from having a radius of curvature less than the minimum bend radius may be used. For example, a semi-circular guide 62 may be used as shown in FIG. 11. Alternatively, a plurality of upright pegs 64 may be used to prevent optical fibers 16 from having a curvature radius less than the minimum bend radius as shown in FIG. 12. Peripheral guides 56 similarly maintain the radius of curvature of optical fibers 16 at or above the minimum bend radius of the fiber and may be any shape or structure as shown in FIGS. 5, 11 and 12. The central guide and/or the peripheral guides may be an optical component including, but not limited to, a holder, a splitter, a filler, a phase shifter or a BRAGG grating. In fact, optical components may be mounted anywhere on the tray.

The loops of optical fibers 16 then extend into storage area 58. By preventing optical fibers 16 from having a radius of curvature less than the minimum bend radius, central guide 54 and peripheral guides 56 establish a lower boundary for fiber storage area 58. The upper boundary for storage area 58 is limited only by the size of tray 18. The wide expanse of storage area 58 allows optical fibers 16 to be stored in an unconstrained manner. Optical fibers are restricted only by central guide 54 and peripheral guides 56. Tray 18 has no guideway, path, retainers or similar structure restricting the upper boundary of storage area 58. As shown in FIG. 5, loops of optical fiber 16 reside in tray 18 relatively unconfined as the area of storage area 58 exceeds the area spanned by the largest loop of optical fiber 16. Granted, the skilled artisan will realize that a large loop of fiber is longer in length than a smaller loop of fiber.

The openness of storage area 58 provides several advantages. First, it is not necessary to wrap or loop the optical fiber about itself in order to make the excess fiber length fit into storage area 58. This reduces the wear and tear on the optical fiber and eliminates fiber slack (i.e., excess fiber not fitting properly in the storage device). Second, storage area 58 can accommodate an enormous range of varying fiber lengths without incremental length constraints as shown by the number of various loop sizes of optical fibers 16 in FIG. 5. Following fusion splicing, the length of the resulting optical fiber can vary dramatically. Conventional storage devices require wrapping the excess fiber around or through a guideway. Hence, the excess fiber length needs to equal the perimeter of the guideway or be a whole interval thereof to avoid fiber slack. This complicates the fusion splicing as it requires the post-splice fiber length to be determined during the splicing process. Use of the trays eliminates the necessity of calculating and cutting precise fiber lengths during splicing as any length of excess fiber is readily stored in tray 18. The loops of optical fiber 16 preferably comprise excess fiber length sufficient for multiple splices. Loops of optical fiber 16 having excess length for at least five splices is preferred. In one embodiment, each loop of optical fiber 16 has a length from about six inches to about 72 inches.

The ability of the trays to hold large lengths of excess fiber provides more fiber maneuverability during fusion splicing. The excess fiber length allows the substrate to remain stationary while the optical fiber is extended to the different operational locations. This enhances the efficiency of the fusion splicing process and improves the quality of the splice.

The loops of optical fiber 16 in FIG. 5 depict closed loops as the fiber in each loop closes upon itself at inlet 52 and outlet 60. Alternatively, the fiber may not close upon itself and thereby forms an open loop of optical fiber 16. Open loops may result when inlet 52 and outlet 60 are located at different parts of tray 18 thereby forming two distinct openings. Furthermore, the fiber may be wrapped upon itself thereby forming multiple loops of optical fiber 16. This may occur when inlet 52 and outlet 60 comprise a single opening or when inlet 52 and outlet 60 form separate openings. Tray 18 accommodates closed loops, open loops and multiple loops or any combination thereof.

Tray 18 may cover the entire area of substrate 12. In this configuration, the ramps may be attached to the outer perimeter of substrate 12. Alternatively, the ramps may be attached to trays 18 adjacent to inlet 52 and/or outlet 60. Preferably, tray 18 does not cover the entire area of substrate 18. This allows the ramps to be attached to the interior of substrate 12 as shown in FIGS. 1, 3, 3A, 5, 10, and 15. Trays 18 and ramps 14a–14i may be made from any suitable material commonly known in the art including, but not limited to, metal, plastic, wood or rubber.

FIG. 5 shows two trays 18 placed above substrate 12. The components situated on substrate 12 and below upper tray 18 are shown in phantom. The tray may rest directly on the upper surfaces of the optical components as shown in FIG. 6 whereby tray 18 is supported by the top surfaces of optical switches 24m–24x. Alternatively, tray 18 is positioned slightly above the components by any method commonly known in the art. For example, supporting structure extending vertically from substrate 12 may hold tray 18 in an elevated position. Trays 18 may be secured by any means commonly known in the art. FIGS. 11 and 12 show bolts 72 attached to substrate 12 extending through tray 18. Nuts 74 secure tray 18 above substrate 12.

Tray lips 66 are integral to tray 18 and extend along the perimeter of tray 18. Lips 66 may extend along the entire perimeter of tray 18 (with the exception of the areas occupied by inlet 52 and outlet 60) or only along a portion of the perimeter of tray 18 as shown in FIG. 5. Each lip 66 has a vertical portion 68 and horizontal portion 70 which extends inwardly above tray 18. Lips 66 thereby retain the loops of optical fibers 16 in storage area 58 as depicted by portions of optical fibers 16 (in phantom) extending underneath horizontal portion 70 in FIG. 5. Similarly, the sectional view of FIG. 6 shows optical fibers 16 in tray 18 retained by lips 66. The length of vertical portion 68 is preferably longer than the diameter of optical fiber 16. In one embodiment, the distance between tray 18 and horizontal portion 70 is between about 0.02 inches to about 0.5 inches.

Figures 15, 16:
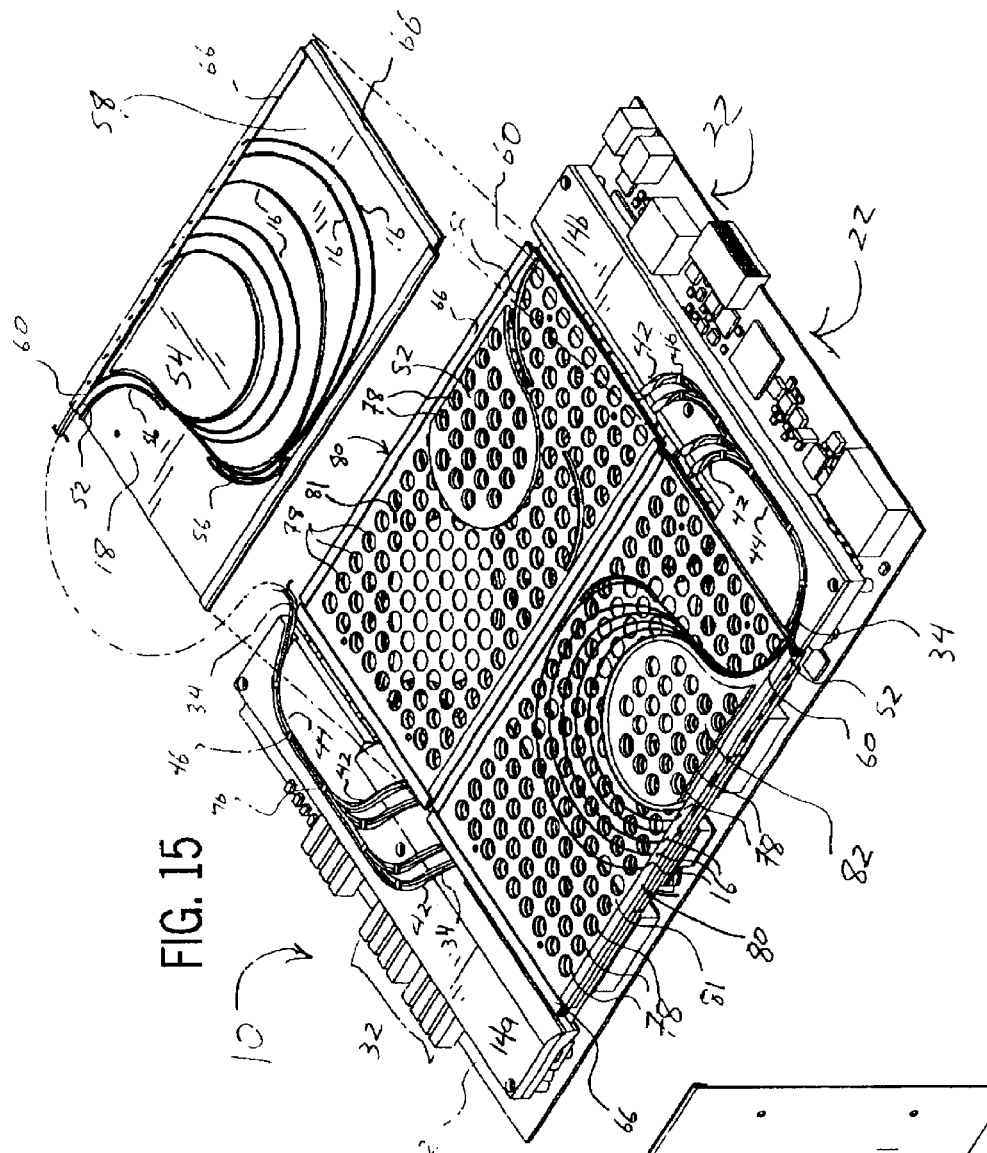
FIG. 15 is a partially exploded perspective view of an alternative embodiment of the optical fiber management system in accordance with the invention.
FIG. 16 is a perspective view of the underside of an alternative embodiment storage device for use in the fiber management system according to the invention.

Trays 18 are stackable and may be located at a plurality of levels above substrate 12. FIG. 6 shows an embodiment wherein three trays 18 are stacked one upon another although the number of trays that can be stacked may vary as desired. A single ramp may extend between substrate 12 and each of the multiple levels defined by the stacked trays. Alternatively, a separate ramp may extend between the substrate and each tray. Correspondingly, multiple trays may be located at the same level. FIGS. 5 and 15 each show two trays 18 located at the same level above substrate 12. It is understood that the trays do not need to be similar in size or shape. The tray may be round, oval or any type of polygon in shape. The skilled artisan will realize that any suitable tray arrangement may be used as long as the radius of curvature for the optical fibers is maintained at or above the minimum bend radius.

Ramps may also extend between trays located at multiple levels. FIG. 13 shows ramp 14f extending between substrate 12 and tray 18 which is located at a first level above substrate 12. In addition, ramp 14g extends between tray 18 located at the first level and tray 18 located at a second level. Tray 18 may also be positioned below substrate 12. In this configuration, ramp 14i extends between substrate 12 and tray 18 located at a level below substrate 12 as shown in FIG. 14. Ramp 14h extends between substrate 12 and tray 18 located above substrate 12 as previously described.

In one embodiment, the optical fibers from each component are routed through the pathways and ramps and into separate trays. Each tray thereby accommodates the fibers from one component. This allows for a reduction of rework time and minimizes the size of the bundles.

In an alternate embodiment of the present invention, the storage tray performs both a fiber management as well as a thermal management function. Tray 80 comprises base 81 which has a plurality of perforations 78 therethrough as shown in FIG. 15. This enables radiant heat from the opto-electronic and/or electronic components to dissipate through perforations 78 thereby cooling the surface temperature of substrate 12. Tray 80 simultaneously accommodates optical fibers 16 as previously discussed. Alternatively, only selected areas of base 81 may have perforations 78. Selected areas on base 81 may be perforated corresponding to areas above hot spots (i.e., heat emitting components) on the substrate while keeping the area above non-heat emitting components non-perforated. Perforations 78 reduce the overall weight of tray 80. Central guide 82 may comprise a plurality of perforations 78 in configurations similar to those described for base 81. Trays 80 may be stacked as previously described. Tray 18 may also be stacked upon any number of trays 80 as shown in FIG. 15.

Another embodiment of the present invention provides tray 84 having fins 86 extending along the bottom surface thereof. The top surface of tray 84 (not shown) may be similar to the trays previously discussed and includes peripheral guides, a central guide, a storage area and lips. Correspondingly, tray 84 accommodates optical fibers similar to tray 18. Fins 86 on the underside of tray base 85 direct the air immediately above substrate 12 in any desired direction. This provides an alternate approach to substrate thermal management whereby fins 86 direct heated air emitted from heated components away from these components. Fins 86 may direct or otherwise dissipate heated air to other cooler areas of the substrate or away from the substrate altogether. Likewise, fins 86 may direct cool air to warmer areas of the substrate. The number of fins 86 may vary as desired and fins 86 may be curved, angled, wavy or formed into any suitable shape as necessary to direct air. Trays 80 and 84 and fins 86 may be made from a high conductivity material such as metal to absorb heat from the components on the substrate. Trays 80 and 84 may also be made from insulative material such as plastic if the radiant component heat is found to be deleterious to the optical fibers stored on the trays.

Once assembly is complete, tray cover 20 is positioned over the trays and secured by any suitable manner known in the art including, but not limited to, screw, clip, bolt, hinge or Velcro. Cover 20 protects optical fibers 16 from damage, dirt and debris while assembly 10 is transported, handled and mounted in its operational environment. Cover 20 may cover a single tray as shown in FIGS. 1 and 10. Alternatively, a large cover 20 may cover all the uppermost trays of a given assembly.

In the event maintenance is required on the surface of substrate 12 or when splicing or re-splicing is necessary, cover 20 is first removed from the trays. The trays are then pivoted or otherwise removed from their stacked positions above substrate 12. Removal of plugs 46 allow fiber bundles 34 to be removed or partially removed from channels 42 and passages 44 as shown in FIG. 10. This allows the trays to be placed away from substrate 12 thereby exposing the optical, opto-electrical and electrical components. Care must be taken when removing the trays in order to maintain fiber bundles 34 at or above the minimum bend radius. The trays retain the optical fibers in a plane away from the plane of the substrate. This protects the fibers from thermal damage during re-splicing or other maintenance on the substrate surface.

FIG. 17 depicts assembly 10 in its operational setting. Rack 88 holds a series of assemblies 10 in a substantially vertical position. Faceplate 90 protects optical fiber connectors 32. Optical fiber connectors 32 allow assembly 10 to connect to other components or assemblies. Assembly 10 may be used as part of a telephone or Internet switch. Other uses of assembly 10 include optical signal treatments such as signal amplification and conditioning, wave division or other multiplexing applications and medical or military image transfer. One of ordinary skill in the art will realize that the present invention is applicable to any optical or opto-electrical assembly having a plurality of optical fibers.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A device for routing optical fiber, said device including a substrate having at least one component mounted thereto, comprising:
    an optical fiber having a minimum bend radius;
    an arrangement of components in opposing relation on the substrate, the arrangement defining a space between surfaces of the opposing components, the surfaces of the opposing components forming an optical fiber pathway; and
    a tray apart from the substrate for storing said optical fiber wherein said optical fiber extends between said substrate and said tray along at least a portion of said optical fiber pathway at or greater than the minimum bend radius of the optical fiber.

2. The device of claim 1, wherein the optical fiber forms an unconstrained loop of optical fiber in the tray.

3. The device of claim 2, wherein said tray further comprises a guide for preventing said loop from having a bend radius that is less than the minimum bend radius of the optical fiber.

4. The device of claim 1, wherein said components are selected from a group consisting of opto-electronic components, optical components and combinations thereof.

5. The device of claim 1, wherein the substrate is located at one level and the tray is located at another level.

6. The device of claim 5, further comprising a ramp extending between said substrate and said tray, wherein said ramp supports said optical fiber at greater than or equal to the minimum bend radius of the optical fiber.

7. The device of claim 6, further comprising a plurality of optical fibers, said optical fibers forming a fiber bundle.

8. The device of claim 7, wherein said ramp further comprises a channel, said fiber bundle at least partially disposed in at least a portion of said channel.

9. The device of claim 8, further comprising a retaining member for retaining the bundle relative to the ramp.

10. The device of claim 8, further comprising a plurality of channels, each channel having at least one fiber bundle at least partially disposed therein.

11. The device of claim 8, wherein said ramp further comprises a passage, wherein a plurality of fiber bundles is routed through a least a portion of the passage.

12. The device of claim 7, wherein the optical fiber bundle forms a plurality of unconstrained loops composed of unbundled optical fiber in the tray.

13. The device of claim 7, further comprising a plurality of trays and a corresponding plurality of ramps wherein at least some of said trays are located at a different level and a corresponding ramp extends between each tray and the substrate.

14. The device of claim 7, wherein each optical fiber of the fiber bundle optically connects at least two components.

15. The device of claim 6, wherein said ramp further comprises at least one optical component mounted thereto.

16. The device of claim 1, wherein the arrangement defines a plurality of spaces between opposing components, and the optical fiber is contained in the plurality of spaces to form the optical fiber pathway pathways.

17. The device of claim 16 further comprising a plurality of optical fiber pathways.

18. The device of claim 1, wherein the optical fiber optically connects at least two components.

19. A device for routing optical fiber along a pathway that extends from one level to another level, said device including a substrate having at least one component mounted thereto, comprising:
    an arrangement of optical components relative to the substrate located at a first level;
    a plurality of optical fibers, said optical fibers forming a fiber bundle;
    a plurality of trays for storing optical fibers in a loop located at a second level; and
    a ramp extending between said substrate and said tray, the ramp having a channel;
    wherein said fiber bundle is at least partially disposed in at least a portion of said channel and extends between said substrate and said plurality of trays along at least a portion of said ramp with the fibers of the bundle extending into said plurality of trays, and wherein said ramp extends between each tray of said plurality of trays and said substrate and each fiber bundle is routed to a separate tray.

20. The device of claim 19, wherein at least some of said trays are located at different levels, said ramp extending between said substrate and each tray.

21. A method of routing optical fiber for an assembly having a substrate with a plurality of components in opposed relation, an optical fiber storage tray apart from the substrate and an optical fiber having a minimum bend radius, the method comprising:
    arranging the components relative to said substrate to define a space between opposing surfaces of the components,
    forming an optical fiber pathway with the opposing surfaces of the components; and
    routing the optical fiber at greater than or equal to the minimum bend radius of the optical fiber through at least a portion of the optical fiber pathway and into the optical fiber storage tray.

22. The method of claim 21, wherein the substrate is located at a first level and the optical fiber storage tray is located at another level.

23. The method of claim 22, further comprising providing a ramp between the substrate and the tray; and
    supporting with the ramp at least of portion of the optical fiber at greater than or equal to the minimum bend radius of the optical fiber.

24. The method of claim 23, wherein the optical fiber storage tray includes a guide for preventing the optical fiber from bending below the minimum bend radius.

25. The method of claim 24, wherein the optical fiber is comprised of a plurality of optical fibers.

26. The method of claim 25, wherein the assembly includes a plurality of optical fiber storage trays with at least some of the optical fiber storage trays located at a different level, and the method further comprising routing the plurality of optical fibers to the plurality of trays.

27. The method of claim 25, further comprising providing a corresponding ramp between each of the plurality of trays and the substrate; and supporting with each ramp the plurality of optical fibers routed to each tray at greater than or equal to the minimum bend radius of the optical fiber.

28. The method of claim 21 wherein the arranging defines a plurality of spaces between the components and the method further comprises containing the optical fiber in the plurality of spaces to form the optical fiber pathway.

29. The method of claim 28 further comprising forming a plurality of optical fiber pathways.

30. A device for routing optical fiber, said device including a substrate at a first level having at least one component mounted thereto and an optical fiber having a minimum bend radius, comprising:

a plurality of components in opposing relation on the substrate, the components arranged to form a space between opposing surfaces of the components;

an optical fiber pathway formed by the opposing surfaces of the components;

a tray at a second level for storing the optical fiber wherein the optical fiber extends between the substrate and the tray along at least a portion of the optical fiber pathway at or greater than the minimum bend radius of the optical fiber.

* * * * *